(12) United States Patent
Liu

(10) Patent No.: US 12,297,945 B1
(45) Date of Patent: May 13, 2025

(54) TUBE CONNECTION AND ITS MECHANISM

(71) Applicant: Liheng Liu, Portland, OR (US)

(72) Inventor: Liheng Liu, Portland, OR (US)

( * ) Notice: Subject to any disclaimer, the term of this patent is extended or adjusted under 35 U.S.C. 154(b) by 0 days.

(21) Appl. No.: 18/596,675

(22) Filed: Mar. 6, 2024

(51) Int. Cl.
*F16L 37/53* (2006.01)
*F16L 37/12* (2006.01)

(52) U.S. Cl.
CPC .............. *F16L 37/53* (2013.01); *F16L 37/12* (2013.01); *F16L 2201/10* (2013.01)

(58) Field of Classification Search
CPC ....... F16L 37/24; F16L 37/252; F16L 37/248; F16L 21/08; F16L 37/53; F16L 37/12
USPC .............................. 285/376, 401, 330, 391, 91
See application file for complete search history.

(56) References Cited

U.S. PATENT DOCUMENTS

| | | | | |
|---|---|---|---|---|
| 222,713 A * | 12/1879 | Lawson | ............... | F16L 9/08 285/391 |
| 771,094 A * | 9/1904 | Rhoads | ............... | F16L 37/252 285/362 |
| 959,226 A * | 5/1910 | Keys | ............... | F16L 37/252 285/391 |
| 1,257,785 A * | 2/1918 | Benzinger | ............... | F16L 47/04 285/376 |
| 4,185,856 A * | 1/1980 | McCaskill | ............... | F16L 37/2445 285/391 |
| 4,209,191 A * | 6/1980 | Lawson | ............... | F16L 37/2445 285/376 |
| 4,260,180 A * | 4/1981 | Halushka | ............... | F16L 37/2445 285/391 |
| 4,280,723 A * | 7/1981 | Moldestad | ............... | F16L 37/113 285/376 |
| 4,406,485 A * | 9/1983 | Giebeler | ............... | F16L 37/2445 285/391 |
| 5,403,043 A * | 4/1995 | Smet | ............... | F16L 37/2445 285/391 |
| 6,283,511 B1 * | 9/2001 | Kamp | ............... | F16L 37/2445 285/391 |
| 2013/0207382 A1 * | 8/2013 | Robichaux | ............... | F16L 37/2445 285/95 |
| 2018/0128406 A1 * | 5/2018 | Kozicz | ............... | F16L 37/252 |

* cited by examiner

*Primary Examiner* — David Bochna

(57) ABSTRACT

A quick-connect and rotatable tube connection comprises a male connector with tiered outer teeth and a female connector with tiered internal annular grooves, which hold the teeth and allow their movement within the grooves. Each groove includes a groove-wall that features cross-channels, enabling the teeth to pass through and enter adjacent annular grooves. Through relative coaxial rotation, aligning or misaligning the teeth with the cross-channels, combined with axial pushing or pulling actions, the connectors engage or disengage. The last annular groove features a stop-wall to limit the maximum axial engagement of the connectors. A locking mechanism with corresponding elements on both connectors restricts their relative rotational movement and prevents disengagement of the tube connection by blocking the alignment of the teeth and cross-channels.

6 Claims, 16 Drawing Sheets

TUBE CONNECTION AND ITS MECHANISM

BACKGROUND OF THE INVENTION

The present invention relates to the field of tube connection, and more particularly to a quick-connect and rotatable tube connection which may include locking mechanism to restrict the rotation when necessary.

Tubes are widely used in our daily lives, fulfilling a diverse range of functions. With the constant advancement of technology and the emergence of new applications, the need for innovative tube connection methods has become increasingly apparent. In most situations, a fixed connection is essential. However, there are scenarios where a tube connection requires to maintain mobility within a designated range. This necessity has led to the development of various rotatable tube connection solutions.

There are several types of rotatable tube connections, such as Rotary Unions, Swivel Joints, Rotating Manifolds, Rotary Couplings, Electrical Rotary Unions etc.
Rotary Unions, are used to transfer fluid from a stationary source to a rotating part, common in applications like rotating drums, rolls, cylinders, or spindles.
Swivel Joints, as exemplified by the design detailed in patent No.: U.S. Pat. No. 5,735,552, Swivel Coupler, allow for full 360-degree rotation and are often used in hoses to prevent kinking or twisting, common in industrial and hydraulic applications.
Rotating Manifolds, are used to distribute fluids to multiple rotating outlets, often seen in automated machinery or complex hydraulic systems.
Rotary Couplings or Rotary Seals, are designed to provide a rotating seal between two machine elements, such as between a stationary part and a rotating drum.
Electrical Rotary Unions (or Slip Rings), provide a rotary connection for electrical signals and power.
In some scenarios, using flexible tubes is also a way of gaining the mobility.

There are several types of quick-connect couplings offer the function of rapid connection and disconnection between tubes, without the need for specialized tools. Quick-connect couplings are typically designed to be operated manually, often with a simple push, pull, or twist action. Based on the connecting mechanism, quick-connect couplings are typically classified into: Twist-to-Lock couplings, Push-to-Connect couplings and Lever-actuated couplings. An example of a Twist-to-Lock coupling is often found in garden hose connections. Lots of under sink pipes and P-trap are also connected by Twist-to-Lock couplings. Push-to-Connect couplings are widely used on vacuum quick release wands or nozzles. Lever-actuated couplings are known for their ease of use and secure, often leak-proof connections. Lever-actuated couplings are popular in industrial and agricultural applications.

Mostly, rotatable tube connections typically do not offer quick-connect functionality. Quick-connect couplings typically do not allow for rotational movement of the connected tubes once coupled. There are only a few types quick-connect tube connections that incorporate rotational capabilities. These tube connections are designed to allow for some degree of movement or rotation after connection, addressing the need for flexibility in certain applications: Swivel Quick-Connect Couplings, Rotary Union Quick-Connects, and Multi-Axis Rotation Couplings.

Swivel Quick-Connect Couplings, are built with a swivel feature that enables the connected tube to rotate, reducing stress on the line and preventing kinking or tangling. This type of coupling is particularly useful in applications where the tube needs to move freely, such as in pneumatic tools or in fluid connections on machinery that moves or vibrates. An example of a Swivel Quick-Connect Couplings is often found in home use pressure washer's quick-connect coupling.

Rotary Union Quick-Connects: Rotary unions are a specialized type of quick-connect coupling designed to allow rotation of the connected parts. They are commonly used in applications involving the transfer of fluids where continuous rotation is required, such as in cooling or heating systems, or in drum or cylinder applications. Quick-Connect Pivoting Coupling for pressure washer is a popular example of Rotary Union Quick-connects.

Multi-Axis Rotation Couplings, as exemplified by the design detailed in patent No.: U.S. Pat. No. 10,619,775 B2, titled MULTI-AXIS ROTATABLE COUPLING ELEMENT FOR A HOSE OR PIPE, it shows the tube connection has an ability of rotate in two axis. Some advanced quick-connect couplings offer multi-axis rotation, providing even greater flexibility. These are designed for complex systems where tubes need to move in multiple directions.

So, in the field of tube connection, most quick-connect tube connections do not support rotation, and those tube connections that do support rotation often lack the quick-connect feature. Even the few types that support both quick-connect and rotation are typically used in applications with smaller tube diameters, and these tube connections themselves tend to have complex structures. There is a need for a tube connection that is structurally simple and cost-effective, offering quick-connect and quick-disconnect functionalities, suitable for a wide range of tube diameters, and allowing for rotation after connection.

SUMMARY OF THE INVENTION

The present invention relates to a quick-connect and rotatable tube connection and its mechanism. This tube connection comprises a male connector with tiered outer teeth and a female connector with tiered internal annular grooves, able to hold the teeth and allowing the teeth to move within the grooves. Each annular groove includes a groove-wall features associated cross-channels that enable the teeth to pass through and enter adjacent annular grooves. Through relative coaxial rotation, to either establish or interrupt the alignment between teeth and cross-channels, along with axial actions, pushing or pulling, the male and female connectors can establish or disengage an interconnection. The last annular groove of the female connector features a stop-wall to be its last wall, limits the maximum axial engagement of the connectors. The present invention enables quick-connection and quick-disconnection, and provides the connectors with the ability to rotate relative to each other while maintaining the engagement of the tube connection. When necessary, it may include a locking feature to limit rotation or to lock the rotation at one or several designated angles.

In certain embodiments, the female connector comprises a sealing ring positioned in its last groove, supported by the stop-wall of the female connector, while the male connector includes a sealing ring located behind the its last tier of teeth, supported by the stop-wall of the male connector. When the two connectors are fully engaged, the sealing rings are situated on two sides of the connectors' interconnection, effectively sealing the quick-connect and rotatable tube connection. In certain embodiments, especially in applications where tube connections' fluid-tight sealing requirements are not strict or minimal, the number of sealing rings can be reduced to one or even be completely omitted. For instance, this approach is suitable when the tube serves as a conduit for cable passage or in specific low-pressure fluid transfer applications where the sealing demands are low.

The quick-connect and rotatable tube connection of the present invention is structurally simple, cost-effective, and suitable for a broad range of applications. It accommodates a wide variety of tube diameters and materials, and allows for relative rotation after the connection is established. The foregoing and other objects and advantages of the present invention will be apparent to those skilled in the art in light of the following detailed description of the present invention provided below, taken in conjunction with the appended claims and the accompanying drawings.

BRIEF DESCRIPTION OF DRAWINGS

Various embodiments of the invention are disclosed in the following detailed description and accompanying drawings.

DETAILED DESCRIPTION OF THE INVENTION

Before describing the present invention in detail, it should be understood that the terminology used herein is for the purpose of describing exemplary embodiments only. The disclosed embodiments are illustrative and not restrictive. As used in this specification and the accompanying claims, terms in the singular forms such as "a", "an," and "the" include their plural referents unless the context clearly dictates otherwise. The scope of the invention encompasses numerous alternatives, modifications, and equivalents; it is limited only by the claims.

The specific details herein are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Figure 1:
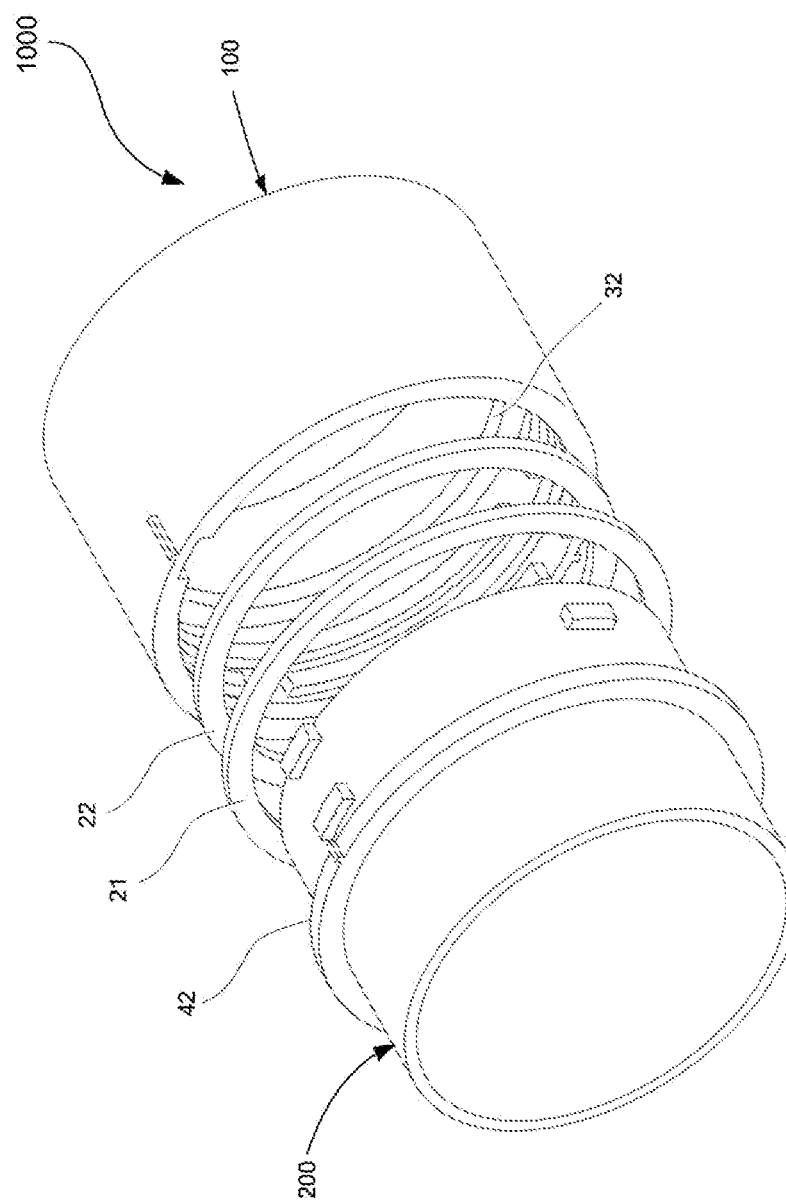
FIG. 1 is an exploded view of one embodiment of a tube connection of the present invention, illustrating the embodiment in a disassembled configuration.

Referring now to an embodiment of the present invention in detail, as shown in FIG. 1, there is a quick-connect and rotatable tube connection 1000. This connection comprises a male connector 200 with tiered outer teeth, and a female connector 100 with corresponding tiered annular grooves and cross-channels. The male connector 200 is equipped with a sealing ring 21, positioned against the stop wall 42, and the female connector 100 includes a sealing ring 22 set against the stop wall 32. As shown in FIGS. 2-7, both sealing rings 21, 22 are correctly positioned. Connectors 200, 100 are made of materials which can be formed to captively hold each other through the interconnection of those teeth and grooves.

Figure 3:
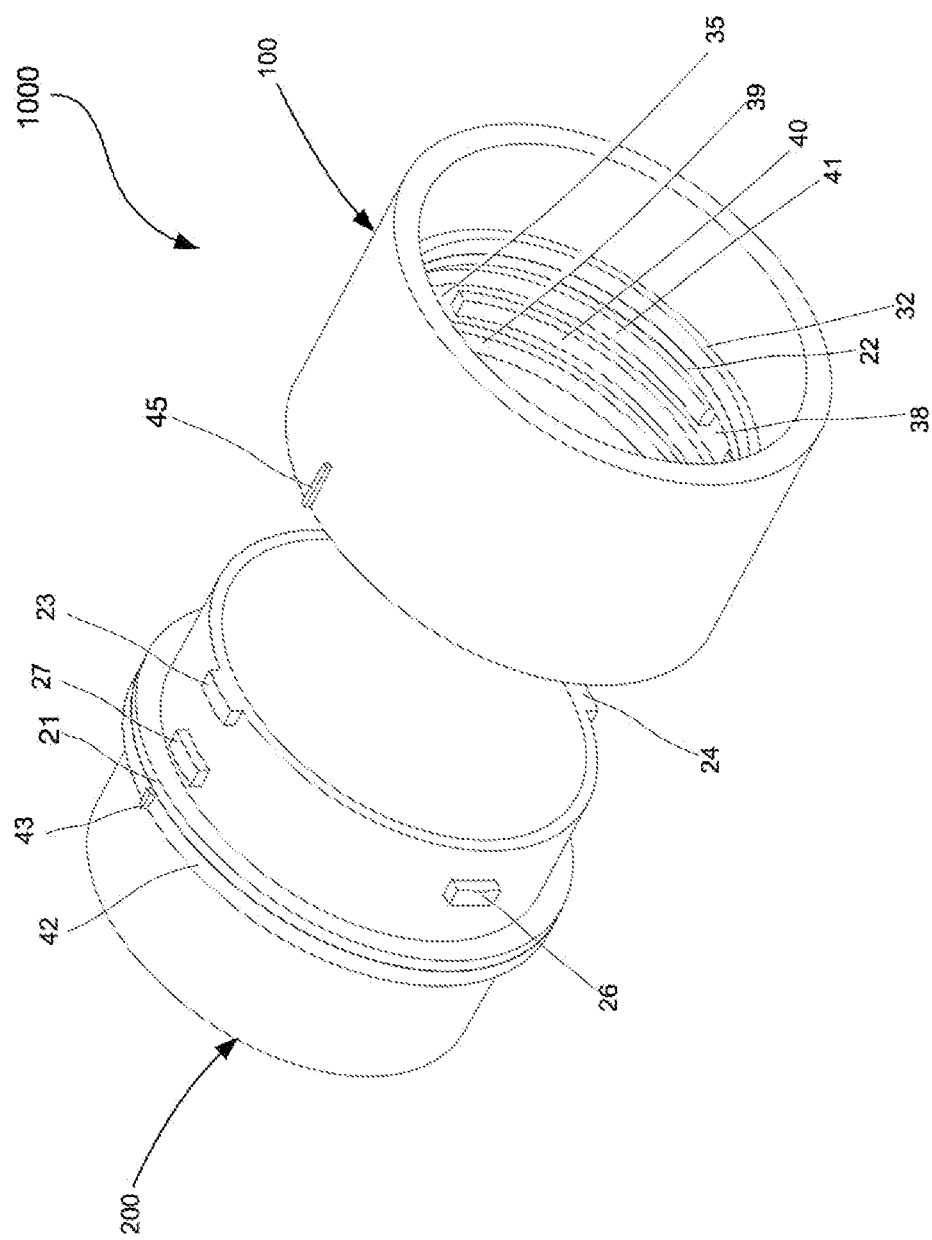
FIG. 3 is another perspective view of a tube connection shown in FIG. 2, from a different angle, illustrating the tube connection in a disconnected configuration, with sealing rings in position.
Figure 4:
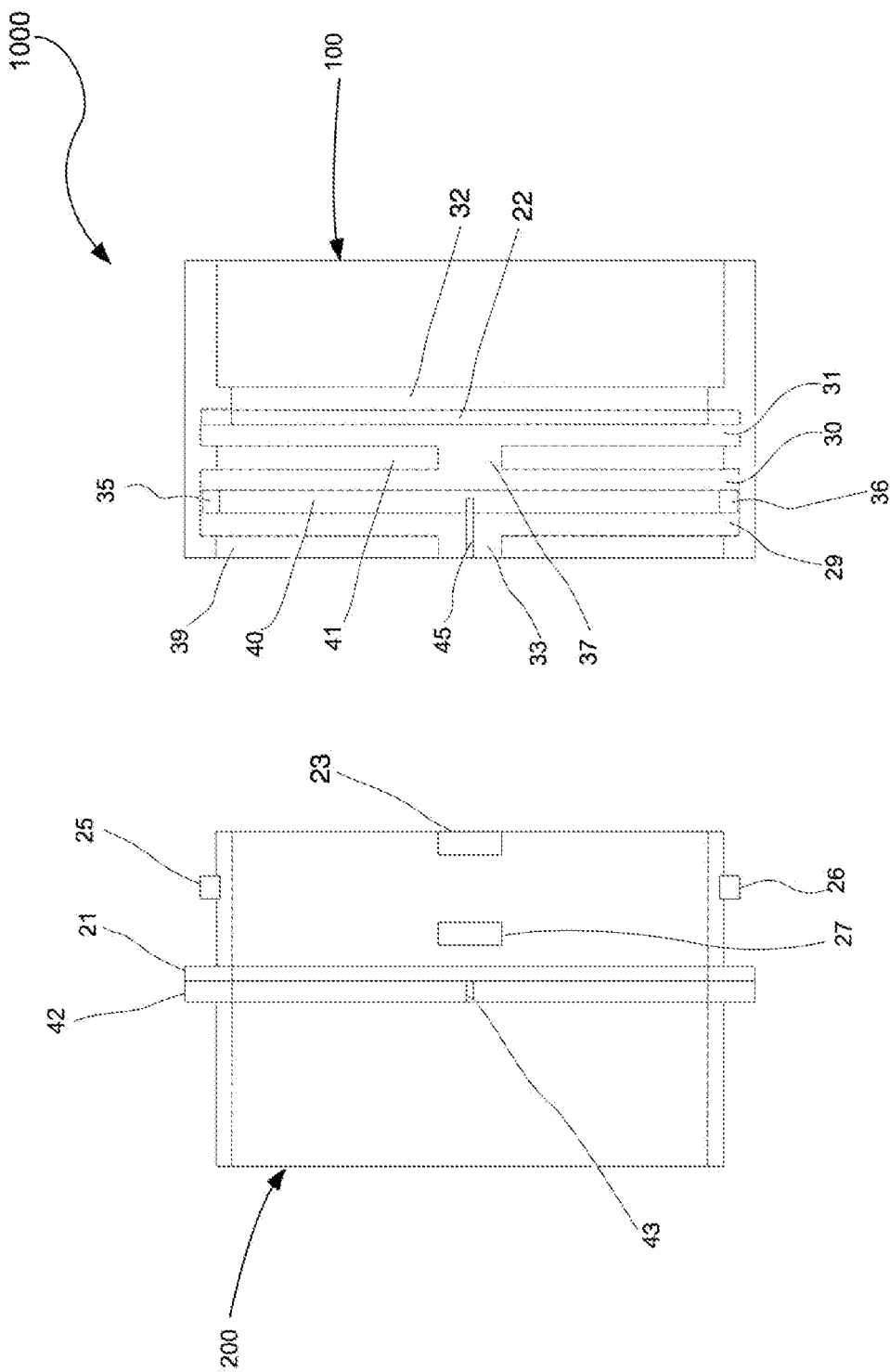
FIG. 4 is a top view of a tube connection of FIG. 2, illustrating the embodiment of the tube connection in a disconnected configuration.
Figure 5:
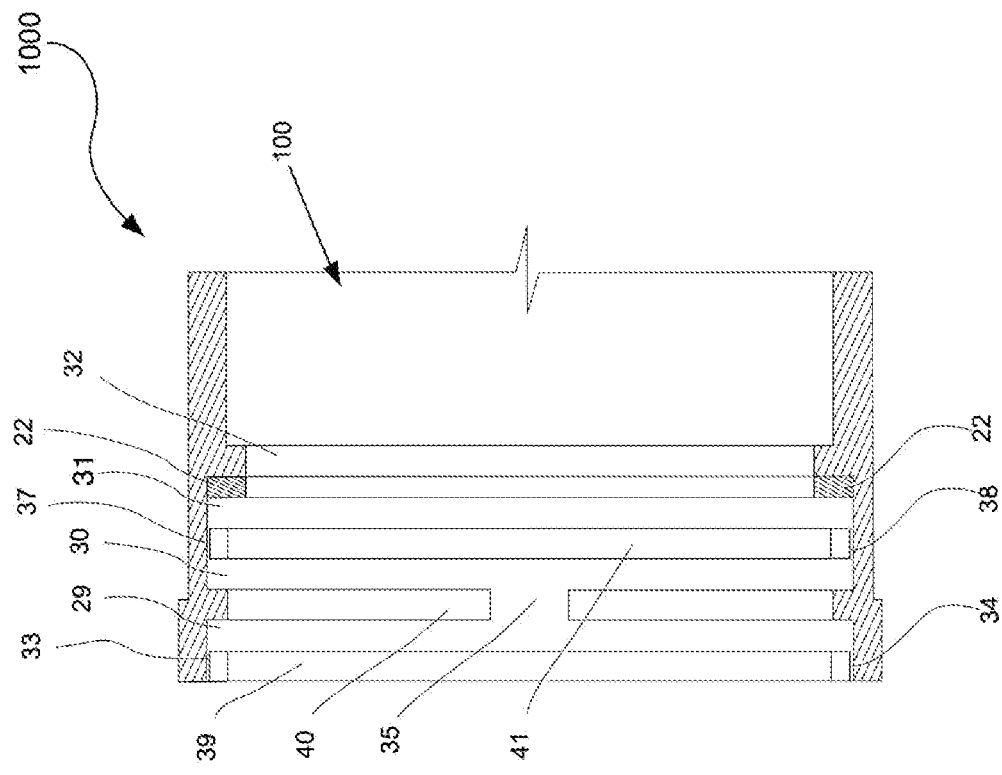
FIG. 5 is a cross-sectional view of a tube connection of FIG. 2, illustrating the embodiment in a disconnected configuration.
Figure 5:
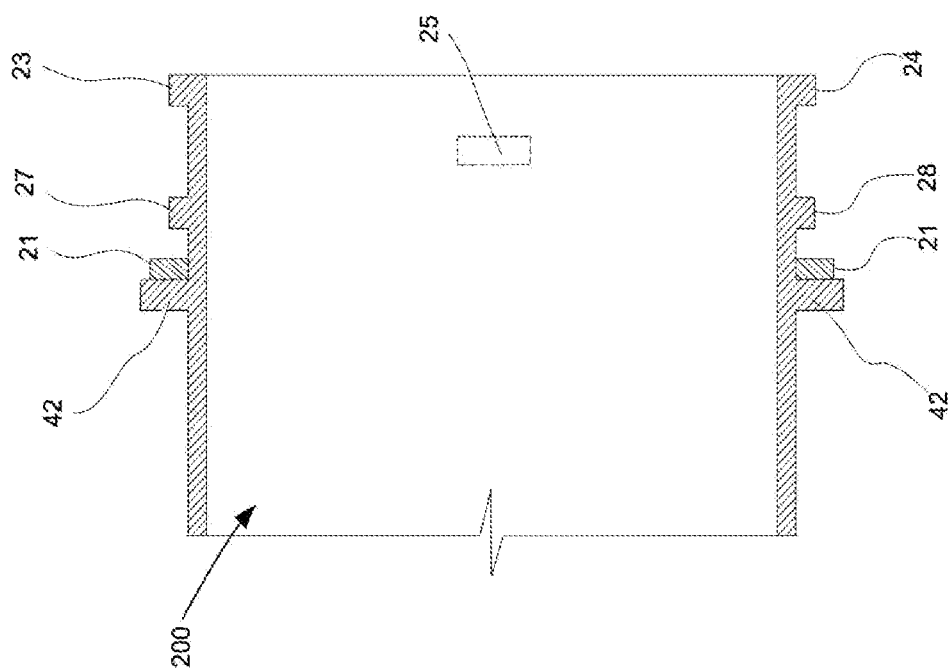
Figure 7:
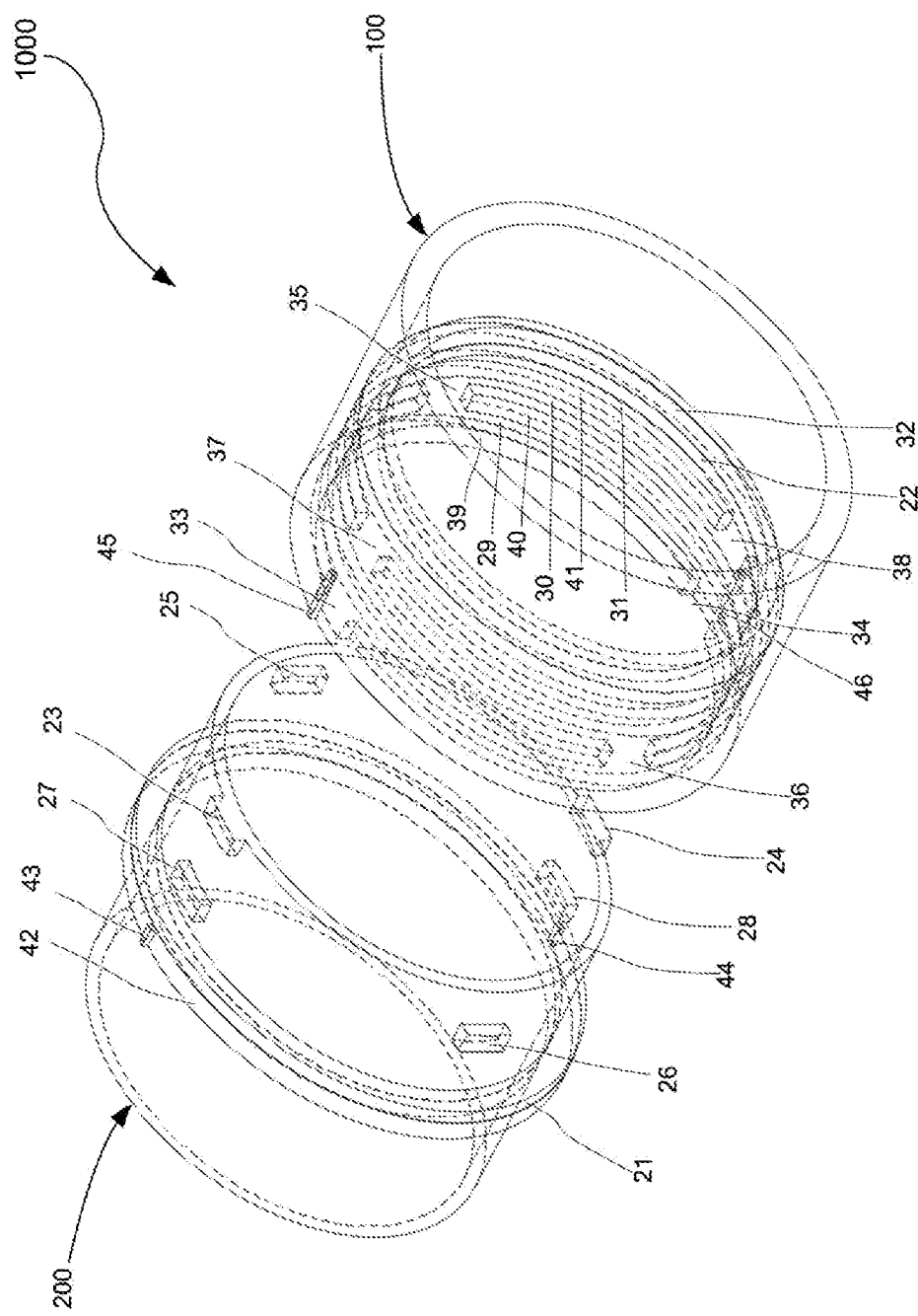
FIG. 7 is another perspective view of a tube connection of FIG. 2, illustrating the embodiment in a disconnected configuration, with sealing rings in position.

In more detail, referring to FIGS. 3, 4, 7, the male connector 200 features three tiers of outer teeth 23-28. In this embodiment of the tube connection 1000 of the present invention, all teeth 23-28 are identical across all tiers in shape and size. Each tier includes two teeth positioned on opposite sides and dividing the circumference into equal halves. Teeth 23 and 24 belong to one tier; teeth 25 and 26, and teeth 27 and 28 are grouped into their respective tiers. The alignment of these teeth is such that each pair's connecting line is perpendicular to adjacent pairs' connecting lines. Specifically, the line connecting the centers of teeth 25 and 26 is perpendicular to the line connecting the centers of teeth 23 and 24, and likewise, the line for teeth 27 and 28 is perpendicular to that of teeth 25 and 26.

In further detail, referring to FIGS. 2-7, the female connector 100 includes three tiers of annular grooves 29-31 to accommodate the movements of teeth 23-28 of the male connector 200. The three tiers of grooves 29-31 have three tiers of groove-walls, identified as 39, 40 and 41. The other wall of the last groove 31 is a stop-wall 32, supporting a sealing ring 22. Corresponding to the sizes and distributions of the three tiers of teeth 23-28 on the male connector 200, each groove-wall includes a pair of cross-channels, which enable the teeth of the male connector 200 to pass through, facilitating their transition into adjacent grooves. Specifically, cross-channels 33-34 belong to groove-wall 39, cross-channels 35-36 belong to groove-wall 40, cross-channels 37-38 belong to groove-wall 41. In this embodiment of the tube connection 1000 of the present invention, all cross-channels 33-38 are identical in shape and size across all tiers. The alignment of these cross-channels is such that each pair's connecting line is perpendicular to adjacent pairs' connecting lines. Specifically, the line connecting the centers of cross-channels 35 and 36 is perpendicular to the line connecting the centers of cross-channels 33 and 34. Similarly, the line for cross-channels 37 and 38 is perpendicular to that of cross-channels 35 and 36.

Figure 2:
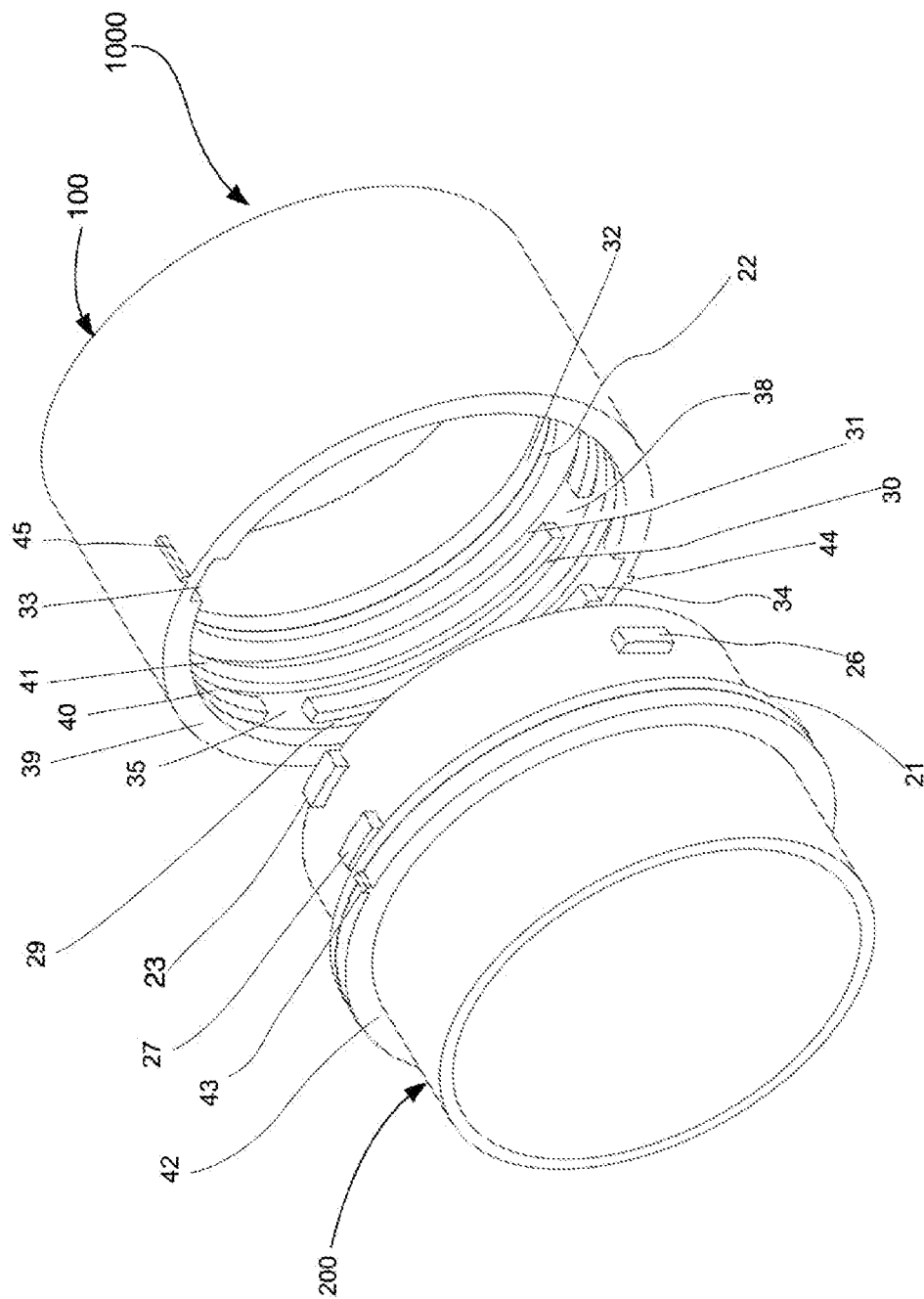
FIG. 2 is a perspective view of a tube connection shown in FIG. 1, illustrating the embodiment of the tube connection in a disconnected configuration, with sealing rings in position.
Figure 6:
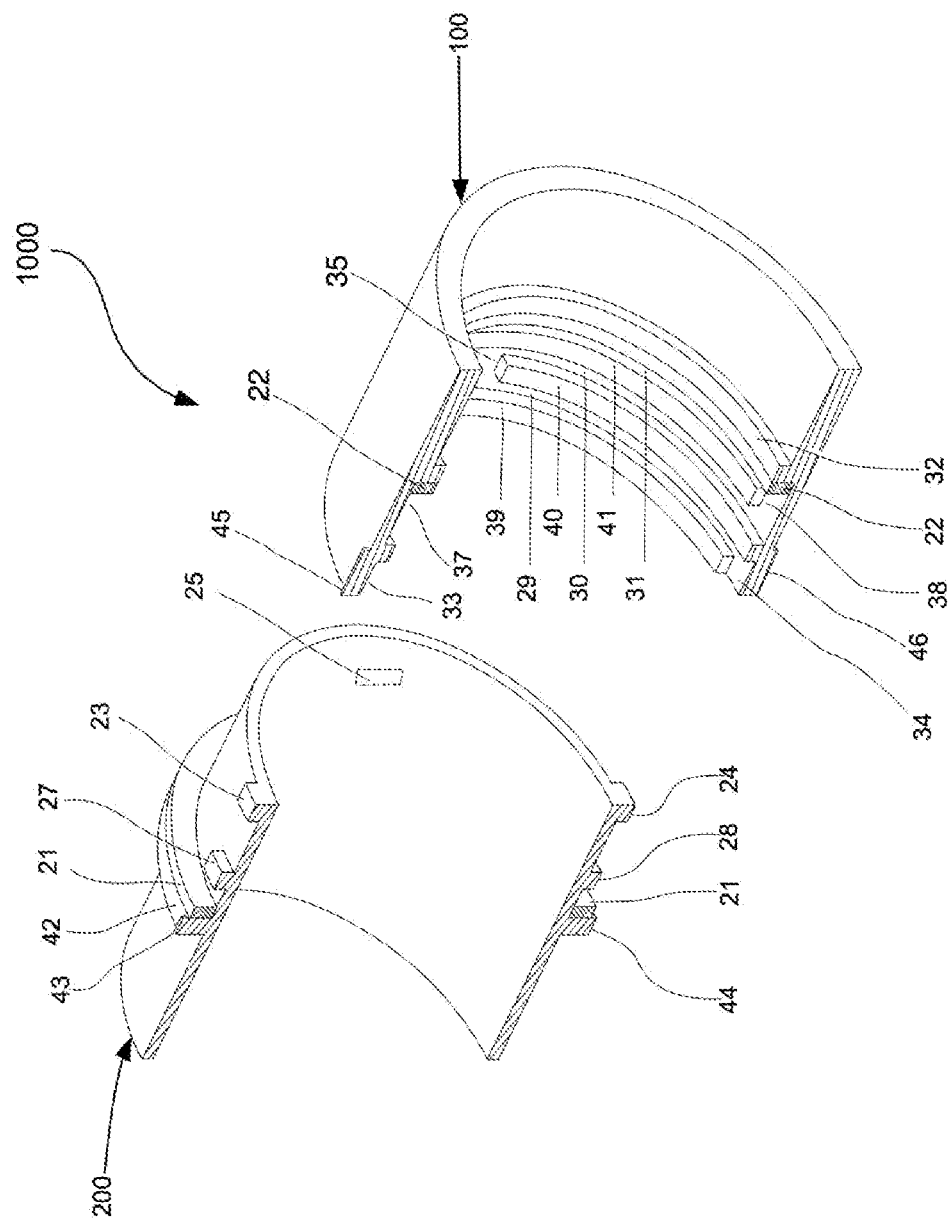
FIG. 6 is a vertical cross-sectional view of a tube connection of FIG. 2, illustrating the embodiment in a disconnected configuration.

Now referring to FIGS. 2, 6, and 7, the male connector 200 has a pair of locators 43 and 44 on the same tier of its outer surface. These locators, 43 and 44, are positioned on opposite sides. Locator 43 is aligned with tooth 23 and 27, locator 44 with tooth 24 and 28. Similarly, the female connector 100 includes a pair of locators, 45 and 46, on the same tier of its outer surface. Locator 45 aligns with cross-channel 33 and 37, locator 46 with cross-channel 34 and 38. When locators 43 and 44 align with locators 45 and 46, it indicates that teeth 23 and 24 align with cross-channels 33 and 34, respectively. In this state, by pushing the male connector 200 and the female connector 100 toward each other, teeth 23 and 24 pass through the groove-wall 39 via cross-channels 33 and 34, entering the annular groove 29.

Subsequently, by twisting and allowing the male connector 200 and the female connector 100 to make a relative coaxial rotation of 90 degrees, in either a clockwise or anticlockwise direction, teeth 23 and 24 align with cross-channels 35 and 36. At the same time, teeth 25 and 26 align with cross-channels 33 and 34. Pushing the male connector 200 and the female connector 100 toward each other in this position allows teeth 23 and 24 to move through groove-wall 40 via cross-channels 35 and 36, thereby entering annular groove 30. Concurrently, teeth 25 and 26 move through groove-wall 39 via cross-channels 33 and 34, entering annular groove 29.

Figure 8:
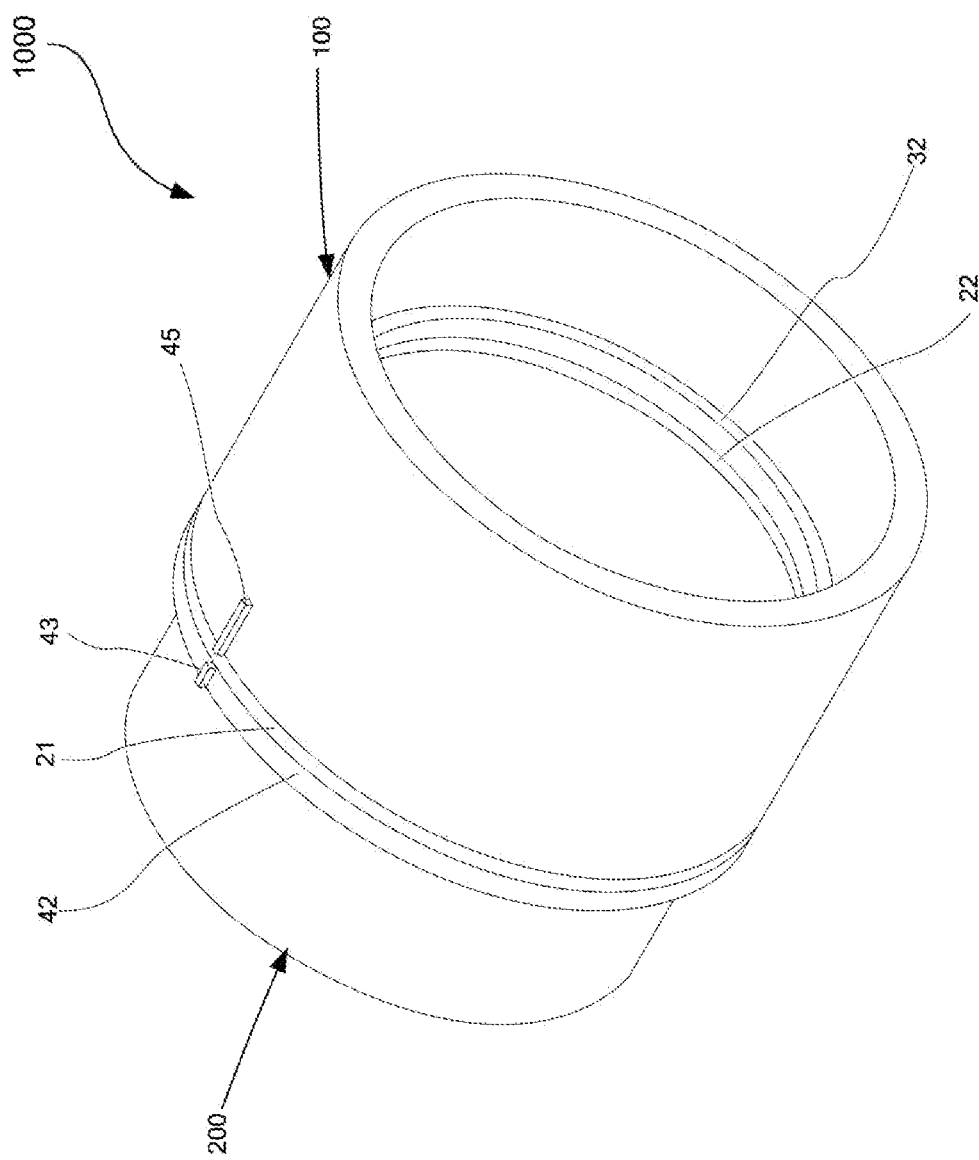
FIG. 8 is a perspective view of a tube connection shown in FIG. 2, illustrating the embodiment of the tube connection in a connected configuration.

Then, by twisting and allowing the male connector 200 and the female connector 100 to make a relative coaxial rotation of an additional 90 degrees, in either a clockwise or anticlockwise direction, teeth 23 and 24 are set aligned with cross-channels 37 and 38. Simultaneously, teeth 25 and 26 align with cross-channels 35 and 36, and teeth 27 and 28 align with cross-channels 33 and 34. At this point, locators 43 and 44 on the male connector 200 realign with locators 45 and 46 on the female connector 100. By pushing the male connector 200 and the female connector 100 toward each other once more, all three tiers of teeth 23-28 are engaged with their respective grooves 29-31: groove 31 accommodates teeth 23 and 24, groove 30 accommodates teeth 25 and 26, and groove 29 accommodates teeth 27 and 28. FIG. 8 illustrates this fully engaged state of the tube connection 1000.

Still referring to FIG. 8, in this state, the male connector 200 and the female connector 100 are fully engaged. The female connector 100 contacts the sealing ring 21 which is supported by the stop wall 42 of the male connector 200. The male connector 200 contacts the sealing ring 22 which is supported by the stop wall 32 of the female connector 100. The stop-walls 32, 42 support sealing rings 22, 21, and also limit the maximum axial engagement of the two connectors 200 and 100. Thus, the tube connection 1000 is sealed by two layers of sealing rings 22, 21 at both ends. The sealing ring 22 sets in groove 31, seals the internal gap of the two connectors 200 and 100, ensures a fluid-tight seal between the fully engaged connectors. The sealing ring 21 sets in front of stop-wall 42, seals the external gap of the two connectors 200 and 100, ensures another layer of fluid-tight seal between the fully engaged connectors. Notably, the tube connection 1000 remains rotatable. Yet, the alignment of locators 43 and 44 with locators 45 and 46 indicates that all teeth 23-28 of the male connector 200 align with all cross-channels 33-38 of the female connector 100. This occurs despite the fact that the alignment of teeth and cross-channels is not externally visible after the tube connection 1000 is fully engaged. It also means that none of the teeth of the male connector 200 are supported by any groove-wall of the female connector 100. In applications where axial pulling forces are exerted from outside the tube connection 1000 or created by fluid pressure within it, the state of the tube connection 1000 shown in FIG. 8 is not stable. Therefore, in order to stabilize the tube connection 1000, by making a coaxial rotation to misalign locators 43 and 44 from locators 45 and 46, then all three tiers of teeth 23-28 on the male connector 200 misalign with all three tiers of cross-channels 33-38 on the female connector 100, resulting in all teeth 23-28 being supported by the groove-walls 39-41.

Figure 9:
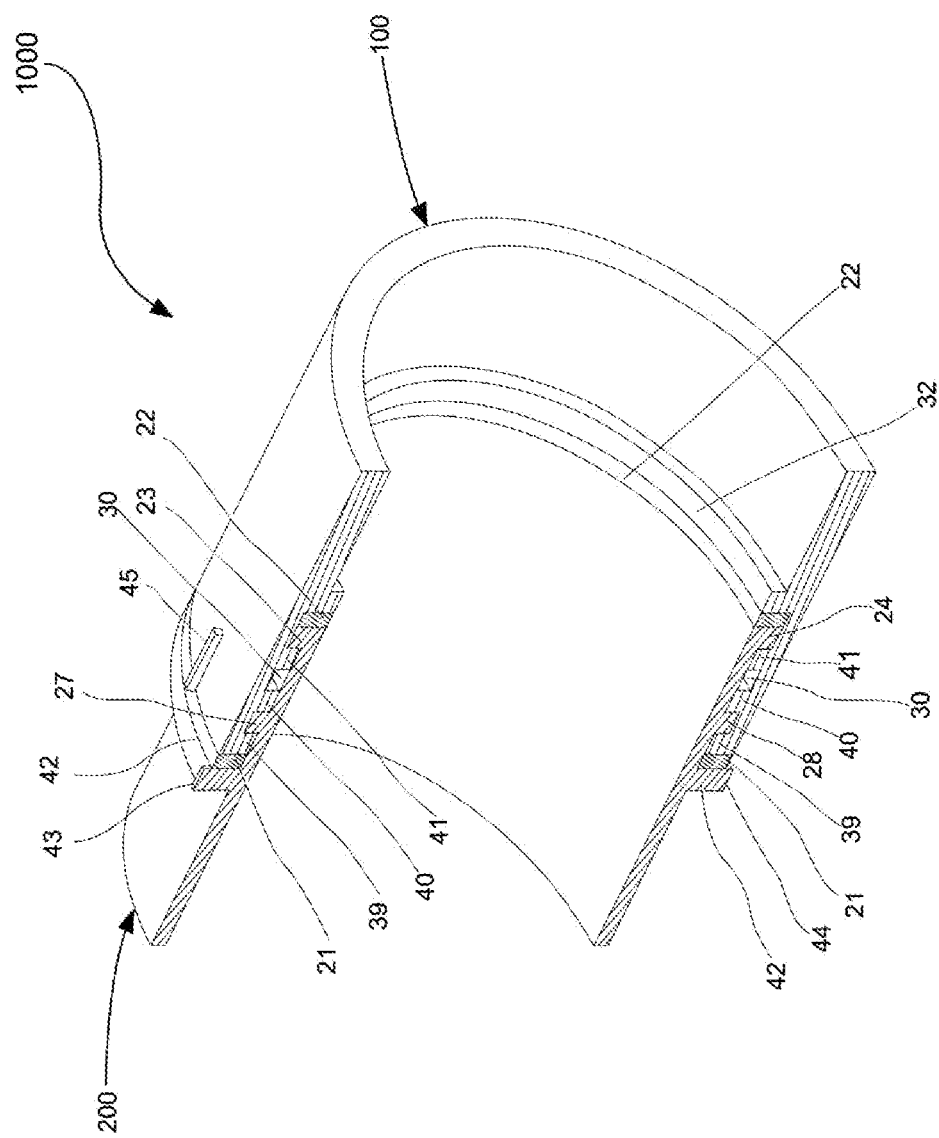
FIG. 9 is a vertical cross-sectional view of a tube connection shown in FIG. 2, illustrating the embodiment in a connected and secured configuration.

Referring now to FIG. 9, it illustrates the state after a relative clockwise coaxial rotation has been made to misalign locators 43 and 44 from locators 45 and 46. Meanwhile, all three tiers of teeth 23-28 on the male connector 200 become misaligned with all three tiers of cross-channels 33-38 on the female connector 100, leading to all teeth 23-28 being supported by three groove-walls 39-41. Specifically, teeth 23 and 24 are supported by groove-wall 41, while teeth 27 and 28 are supported by groove-wall 39. Additionally, teeth 25 and 26 receive support from groove-wall 40, even though this is not visible in vertical cross-sectional view FIG. 9, nor from the exterior of the tube connection 1000.

Continuing the above clockwise rotation, the coaxial movement persists, every tooth (23 through 28) will shift from its initial alignment with one cross-channel to alignment with the adjacent cross-channel within the same tier of groove-walls, as depicted in the transition from FIG. 8. Initiating the rotation from the configuration shown in FIG. 8, locator 43 aligns with locator 45 and locator 44 with locator 46. Within the interior of the tube connection 1000, tooth 23 aligns with cross-channel 37 and tooth 24 with 38 (FIG. 7); concurrently, tooth 25 aligns with 35, tooth 26 with 36, tooth 27 with 33, and tooth 28 with 34. After a 180-degree rotation, the alignment shifts: locator 43 aligns with locator 46, and locator 44 with locator 45. Correspondingly, inside the tube connection 1000, tooth 23 aligns with cross-channel 38 and tooth 24 with 37; tooth 25 with 36, tooth 26 with 35, tooth 27 with 34, and tooth 28 with 33. This 'misalignment range,' the span between these two states of alignment, allows the tube connection 1000 to rotate freely, with each tooth 23-28 securely supported by groove-walls 39-41. Moreover, this configuration ensures that the tube connection 1000 remains sealed at both ends by sealing rings 21 and 22. In this embodiment, the misalignment range is 180 degrees. Notably, the exact degree range of continuous rotation with all teeth fully supported is smaller than the misalignment range. This exact degree range dependents on the specific dimensions of the teeth, cross-channels, and the diameters of the tube connectors.

Referring to FIGS. 3-9, the disengagement process for the tube connection 1000 reverses the engagement steps outlined in sections to [0039]. First, rotate the connectors to align locators 43 and 44 with locators 45 and 46 as demonstrated in FIG. 8. Then, pull the male connector 200 and the female connector 100 apart, causing teeth 23 and 24 to exit groove 31 and enter groove 30, finding support on groove-wall 40. At the same time, teeth 25 and 26 move from groove 30 to groove 29, supported by groove-wall 39, and teeth 27 and 28 exit groove 29 to disengage from the female connector 100. Following this, a relative coaxial rotation of 90 degrees and another pull enable teeth 23 and 24 to leave groove 30 and enter groove 29, finding support on groove-wall 39, while teeth 25 and 26 disengage from the female connector 100. Repeating this sequence once more allows teeth 23 and 24 to finally exit groove 29, completing the disengagement of the male connector 200 from the female connector 100.

While various details of an exemplary embodiment of the present invention have been described, it should be understood that there are other embodiments of the present invention. The number of tiers of teeth, as well as the number of teeth on each tier, may vary across different embodiments. Additionally, the numbers of teeth on different tiers may differ, the distribution of teeth on each tier may vary, and the size and shape of different teeth may also vary. Correspondingly, the number of tiers of grooves and groove-walls, as well as the number of cross-channels on each groove-wall, may vary across different embodiments. The numbers of cross-channels on different groove-walls may differ, the distribution of cross-channels on each tier of groove-wall may vary, and the size and shape of different cross-channels may vary. In certain embodiments, especially in applications where tube connection sealing requirements are minimal, the number of sealing rings can be reduced to one or even be completely omitted. In some applications, locking mechanisms may be included to limit the rotation when necessary. The rotatability of the tube connection may vary. For example, in the embodiment shown in FIGS. 1-9, every step of the engagement or disengagement process requires a 90-degree rotation followed by axial movements, pushing or pulling. This is attributed to all teeth 23-28 and all cross-channels 33-38 being identical and evenly distributed, with perpendicular connecting lines as described in section [0033]. If the teeth and cross-channels are not uniform, meaning not all teeth are identical, not all cross-channels are identical, then the degrees of rotation for each stage of the engagement or disengagement process can deviate from 90 degrees. Changes in the distribution of teeth and cross-channels may also lead to variations in the degrees of rotation required for each stage of the engagement or disengagement process of the tube connection. The range of continuous rotation may also be affected. For certain applications, including those where tubes are used for cable passage, there is no fluid sealing requirement for the tube connection, no sealing ring is necessary for the tube connection. Details of two other exemplary embodiments of the present invention are described in the paragraphs below.

Figure 10:
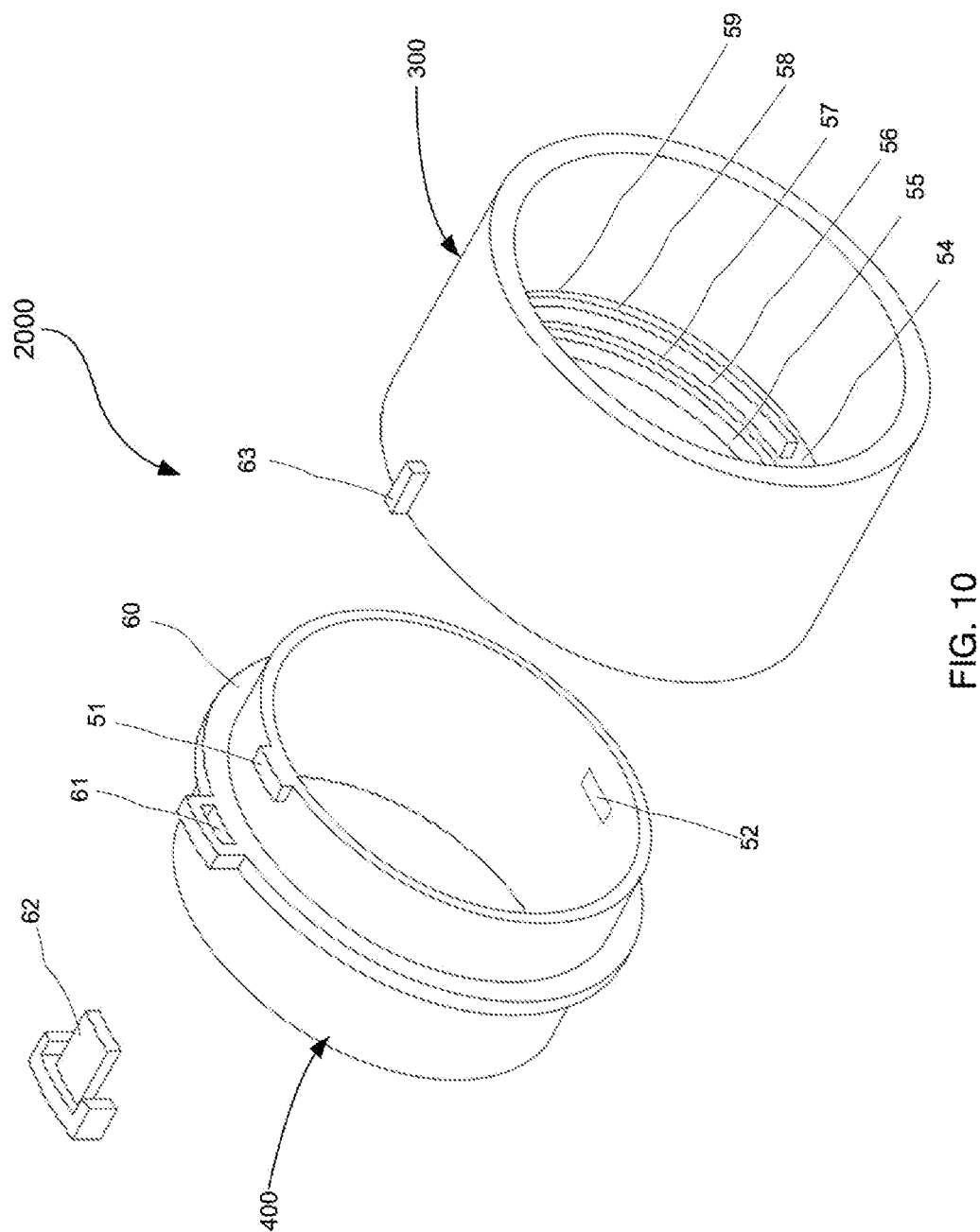
FIG. 10 is a perspective view of one alternative embodiment of a tube connection of the present invention, illustrating the embodiment in a disconnected configuration.
Figure 11:
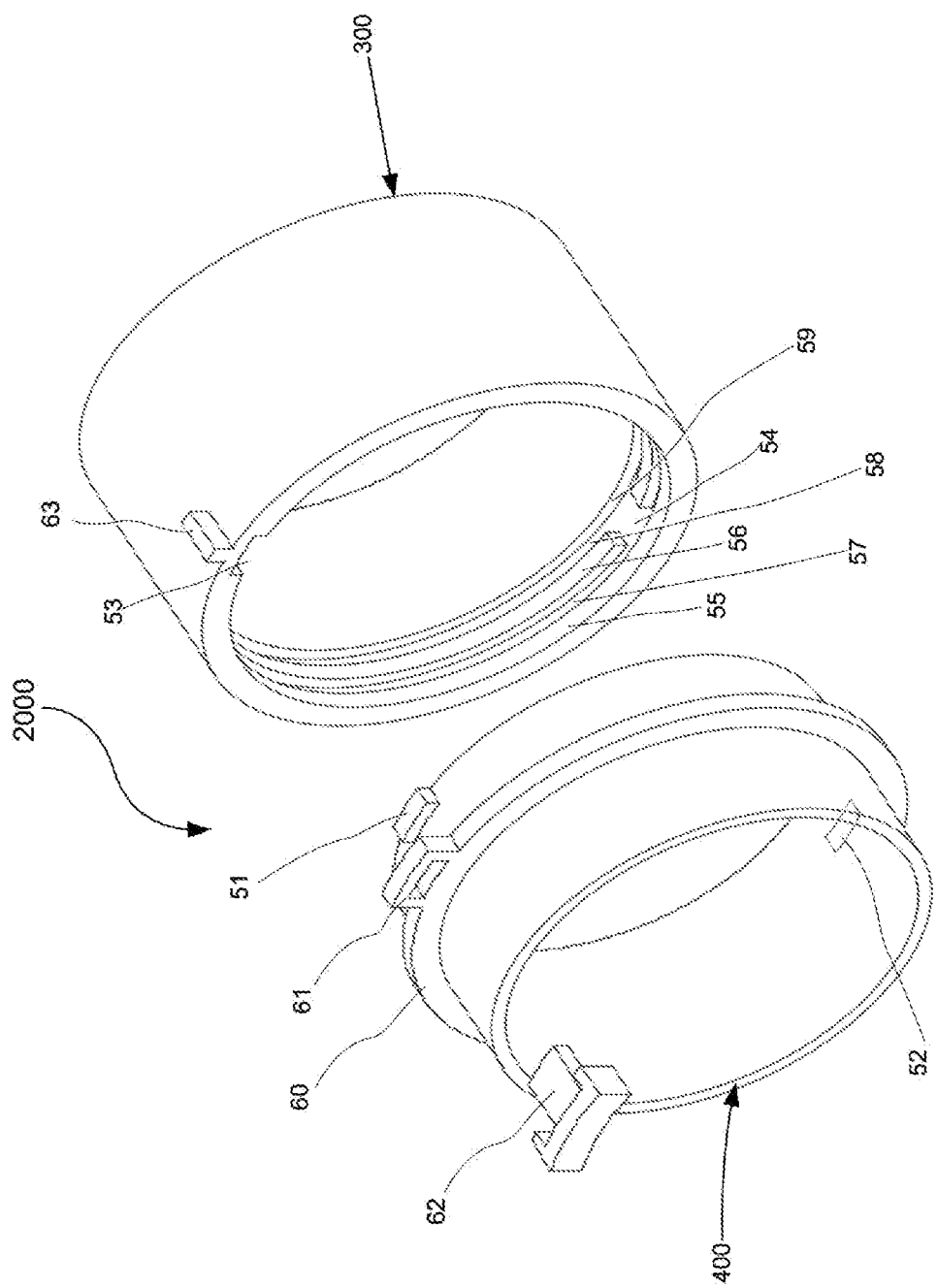
FIG. 11 is another perspective view of a tube connection shown in FIG. 10, illustrating the embodiment in a disconnected configuration.

Referring now to an alternative embodiment of the present invention in detail, as illustrated in FIGS. 10 and 11, a quick-connect and rotatable tube connection 2000 is presented, comprising a male connector 400 with two tiers of outer teeth 51, 52, and a female connector 300 with two tiers of internal annular grooves 57, 58, alongside two tiers of groove-walls 55, 56. Additionally, the tube connection 2000 includes a locking latch 62 to secure the connection while maintaining rotatability. The tiered grooves 57, 58 of the female connector 300 are designed to accommodate the movement of the tiered teeth 51, 52 of the male connector 400. The tiered teeth 51, 52 are positioned on opposite sides of the circumference of the male connector 400 but belong to different tiers. On the female connector 300, each groove-wall includes a cross-channel to allow the teeth of the male connector 400 to pass through, thereby facilitating their entry into the adjacent groove. Cross-channel 53 is part of groove-wall 55, and cross-channel 54 belongs to groove-wall 56.

In further detail, FIG. 11 shows the male connector 400 includes a fixed latch receiver 61 on its outer surface to receive the removable locking latch 62. The latch receiver 61, aligning with tooth 51, also serves as a locator on the male connector 400. Similarly, the female connector 300 includes a fixed latch stopper 63 on its outer surface, which aligns with cross-channel 53 and acts as a locator on the female connector 300. Unlike the previous embodiment shown in FIGS. 1-9, this embodiment (shown in FIGS. 11-12) does not include sealing rings on either the male connector 400 or the female connector 300, making it suitable only for applications without strict sealing requirements. It's noteworthy that based on specific application requirements, some embodiments of the tube connection of the present invention may include one sealing ring to make the tube connection fluid-tight.

Continuing with FIG. 11, engaging the male connector 400 and the female connector 300 involves initially rotating to align the latch receiver 61 with the latch stopper 63, indicating alignment of tooth 51 with cross-channel 53. By pushing the male connector 400 and the female connector 300 toward each other, tooth 51 passes through groove-wall 55 via cross-channel 53 into annular groove 57. A subsequent relative coaxial rotation of 180 degrees, clockwise or anticlockwise, aligns tooth 51 with cross-channel 54, and tooth 52 with cross-channel 53. In this configuration, pushing the male connector 400 and the female connector 300 toward each other again allows tooth 51 to pass through groove-wall 56 via cross-channel 54, and enter annular groove 58. Meanwhile, tooth 52 enters annular groove 57 through groove-wall 55 via cross-channel 53. With tooth 51 reaching stop wall 59 and groove wall 55 reaching stop wall 60, the connectors 400 and 300 are fully engaged.

Figure 12:
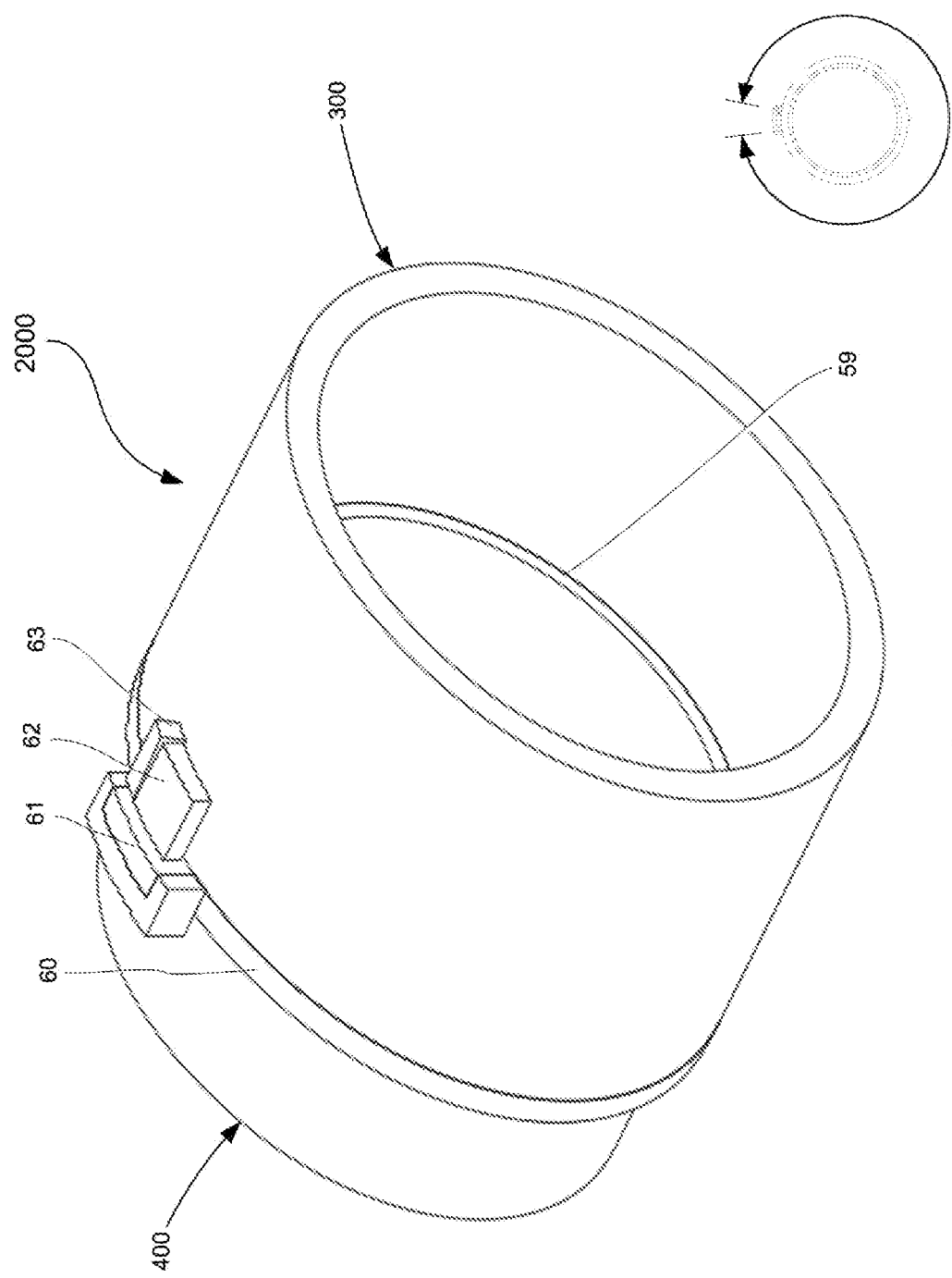
FIG. 12 is a perspective view of a tube connection shown in FIG. 10, illustrating the embodiment of the tube connection in a connected and rotatable configuration, with locking latch secured.

In more detail, FIG. 12 illustrates the engaged tube connection 2000 after a coaxial rotation misaligns the latch receiver 61 from the latch stopper 63, causing teeth 51, 52 to misalign with cross-channels 53, 54, resulting in the teeth being supported by the groove-walls. Specifically, tooth 51 is supported by groove-wall 56, while tooth 52 is supported by groove-wall 55. The tube connection 2000 remains rotatable. For the embodiment of the present invention as shown in FIGS. 11-12, the misalignment range, the continues rotation range between two alignment states is 360 degrees. In order to limit rotation and prevent realignment, inserting the locking latch 62 into the latch receiver 61 prevents the latch receiver 61 from realigning with latch stopper 63. Then, rotating the tube connectors around causes the locking latch 62 and latch stopper 63 to collide on both sides, locking the teeth 51, 52 out of alignment with the cross-channels 53, 54. Thus, the tube connection 2000's secured rotatability is nearly 360 degrees. Notably, the exact degree range of continuous rotation with all teeth fully supported is smaller than the misalignment range. The exact degree range dependents on the specific dimensions of the teeth, cross-channels, the locking latch 62, the latch stopper 63, and the diameters of the tube connectors.

The disengagement process for tube connection 2000 reverses the engagement steps from sections to [0046]. Start by removing the locking latch 62, then rotate the connectors 400, 300 to align the latch receiver 61 with the latch stopper 63. Pulling the connectors 300, 400 apart allows tooth 51 to leave groove 58 for groove 57, supported by groove-wall 55, while tooth 52 disengages from the female connector 300. Another 180-degree rotation and pull completely disengage the male connector 400 from the female connector 300.

It is worth noting again that the tube connection of the present invention does not limit the teeth to being identical in shape and size, the cross-channels do not have to be identical either. In this exemplary embodiment of the tube connection 2000 of the present invention shown in FIGS. 10-12, during the engagement and disengagement processes, both teeth 51 and 52 must pass through cross-channel 53, but only tooth 51 needs to pass through cross-channel 54. Groove 57 must accommodate the movement of both teeth 51 and 52, whereas groove 58 only needs to accommodate tooth 52. Thus, teeth 51 and 52 can be different in size and shape, accordingly cross-channels can be different in size and shape, grooves can be different in shape and size; for instance, tooth 51 can be smaller than tooth 52, cross-channel 54 can be smaller than cross-channel 53, groove 58 can be smaller than groove 57, then both teeth 51 and 52 can pass through the larger cross-channel 53, larger groove 57 can accommodate both teeth 51 and 52, the smaller tooth 51 can pass through the smaller cross-channel 54 and get into and be accommodated by the smaller groove 58, allowing the two connectors 400, 300 to be fully engaged.

As a whole, comparing the embodiment shown in FIGS. 10-12 with that of FIGS. 1-9 demonstrates the descriptions made in section [0042]. It highlights that in different embodiments of the present invention, the number of tiers of teeth may vary, as well as the number of teeth on each tier. Additionally, the numbers of teeth on different tiers may differ, the distribution of teeth on each tier may vary, and the size and shape of the teeth may also differ. Correspondingly, the number of tiers of grooves and groove-walls may vary, the number of cross-channels on each groove-wall may differ, the numbers of cross-channels on different groove-walls may vary, the distribution of cross-channels on each groove-wall may change, and the size and shape of different cross-channels may also differ. In certain embodiments, particularly in applications where tube connection sealing requirements are minimal, the number of sealing rings can be reduced to one or even be completely omitted. In some applications, locking mechanisms may be included to limit rotation when necessary. The rotatability of the tube connection may vary. If making a small change to the embodiment of the present invention depicted in FIG. 10-12, such as adding another tooth on the same tier but on the opposite side of tooth 52 with an identical size and shape, and correspondingly adding another cross-channel on groove-wall 55 but on the opposite side of cross-channel 53, then the new embodiment of the tube connection would have three teeth in total across two different tiers. This modification further illustrates the description made in section that in different embodiments, the numbers of teeth on different tiers and the numbers of cross-channels on different groove-walls may differ.

Figure 13:
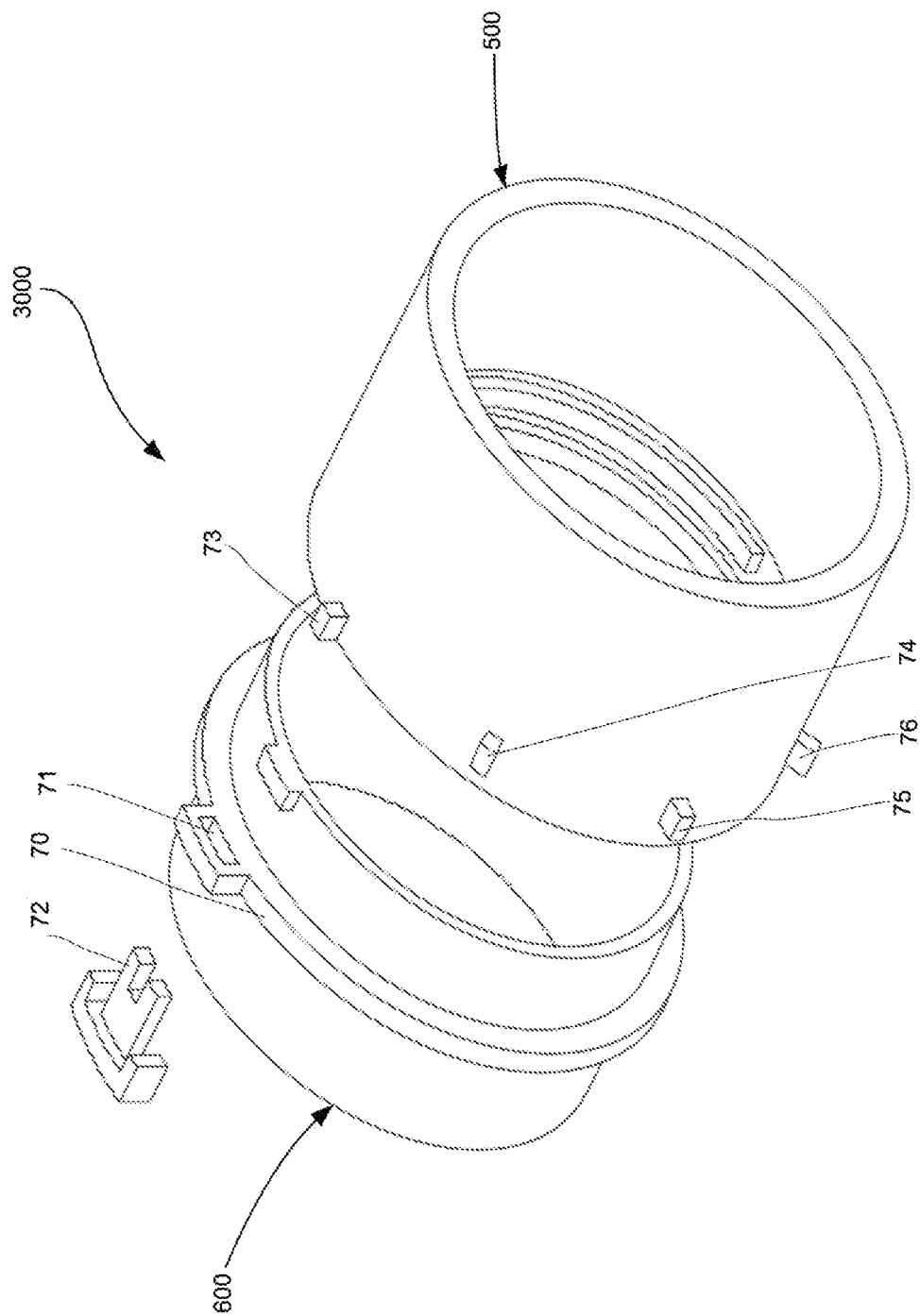
FIG. 13 is a perspective view of another alternative embodiment of a tube connection of the present invention, illustrating the embodiment in a disconnected configuration.

Referring now to another alternative embodiment of the present invention in detail, as illustrated in FIG. 13, a quick-connect and rotatable tube connection 3000 is presented. This embodiment comprises a male connector 600 with two tiers of outer teeth, and a female connector 500 with two tiers of internal annular grooves. The tube connection 3000 also includes a locking latch 72 to secure the connection, restrict the rotatability of the tube connection 3000 to several designated ranges, or even disable the rotatability entirely in designated positions.

In further detail, the embodiment shown in FIG. 13 features the same structure as the embodiment depicted in FIGS. 10-12, including the same tiered teeth, annular grooves, groove-walls, cross-channels, stop-walls, and latch receiver. The only differences are in the locking latch 72 (previously in FIG. 11, indicated as 62) and the latch stoppers 73-76 (previously in FIG. 11, indicated as 63). Specifically, the embodiment of FIG. 13 includes four latch stoppers (73-76) on two tiers of the outer surface of the female connector 500, as opposed to just one in FIG. 11. Latch stopper 73 is on the first tier, aligned with the first tier of cross-channels (previously in FIG. 11, indicated as 53), while latch stoppers 74-76 are on the second tier. The locking latch 72 is fork-shaped, matching the size and shape of all identical latch stoppers 74-76, and can hold and secure them when required. The engagement and disengagement processes of connectors 600 and 500 remain the same as those described for the embodiment in FIG. 10 (sections [0045] to [0046]). Subsequent paragraphs focus on explaining how the locking latch 72 and the four latch stoppers 73-76 function in the new embodiment presented in FIG. 13.

Figure 14:
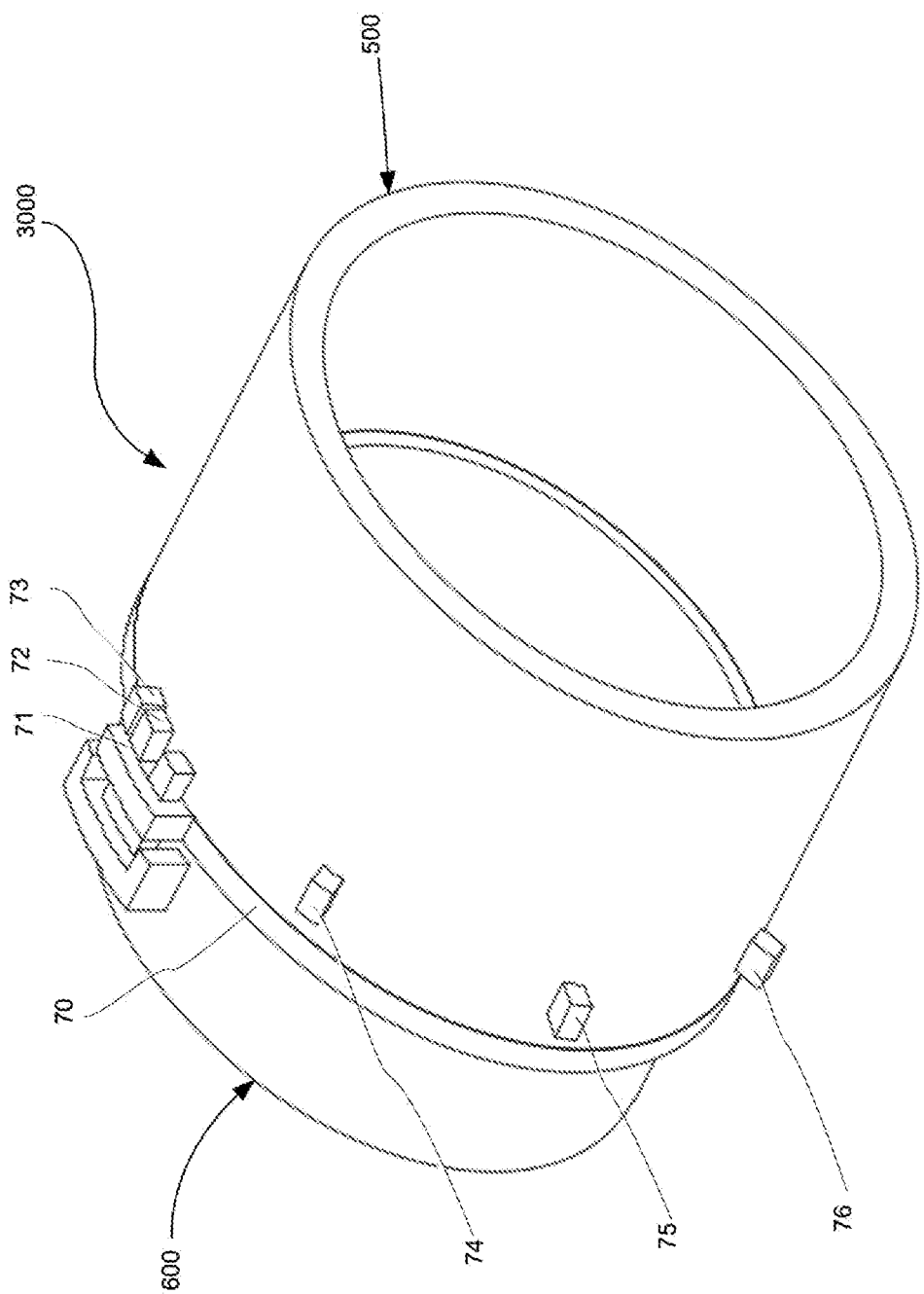
FIG. 14 is a perspective view of a tube connection shown in FIG. 13, illustrating the embodiment of the tube connection in a connected and rotatable configuration, with locking latch secured.
Figure 15:
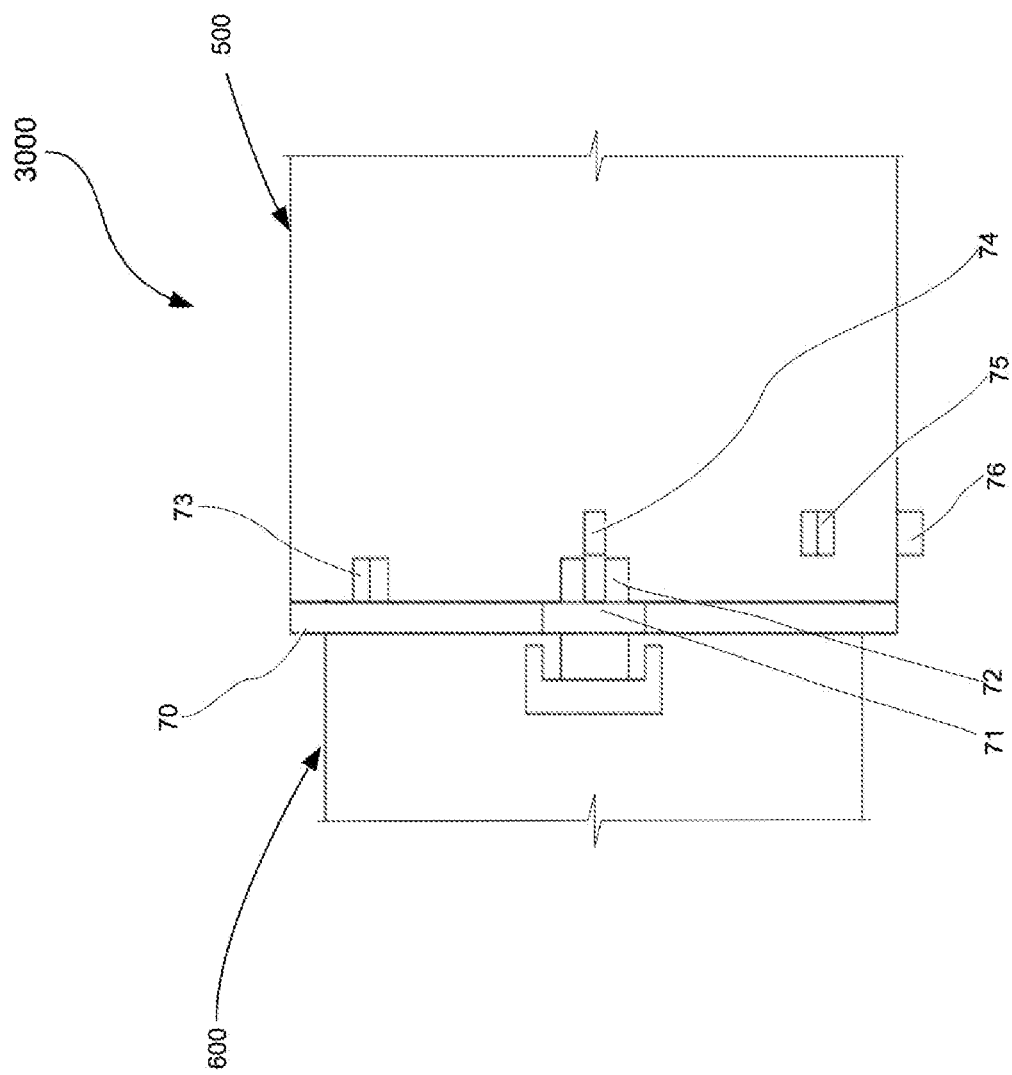
FIG. 15 is a top view of a tube connection shown in FIG. 13, illustrating the embodiment of the tube connection in a connected and rotatable configuration, with locking latch secured.

In more detail, referring to FIGS. 14-15, after the male connector 600 and the female connector 500 are fully engaged, rotate the tube connectors to misalign the latch receiver 71 and the latch stopper 73. Insert the locking latch 72 into the latch receiver 71 as shown in FIG. 14, blocking the rotation path of the first tier of latch stopper 73 but not affecting the second tier of latch stoppers 74-76. Consequently, within the connection, all teeth are unable to realign with the cross-channels. When rotating the tube connectors 600 and 500, the locking latch 72 and the latch stopper 73 will collide on both sides, without impacting the second tier of latch stoppers 74-76. As a result, the tube connection 3000 is locked within the misalignment range, and the secured rotatability of the tube connection 3000 in the embodiment of the present invention is nearly 360 degrees. If the locking latch 72 is inserted all the way down to the rotation track of the second tier of latch stoppers 74-76, then the secured rotatability of the tube connection 3000 is limited to a range between two adjacent latch stoppers 73-76. Specifically, users can choose to insert the locking latch 72 in between 73 and 74, or between 74 and 75, or between 75 and 76, or between 76 and 73, thereby limiting the rotatability of the tube connection 3000 to those designated ranges.

Figure 16:
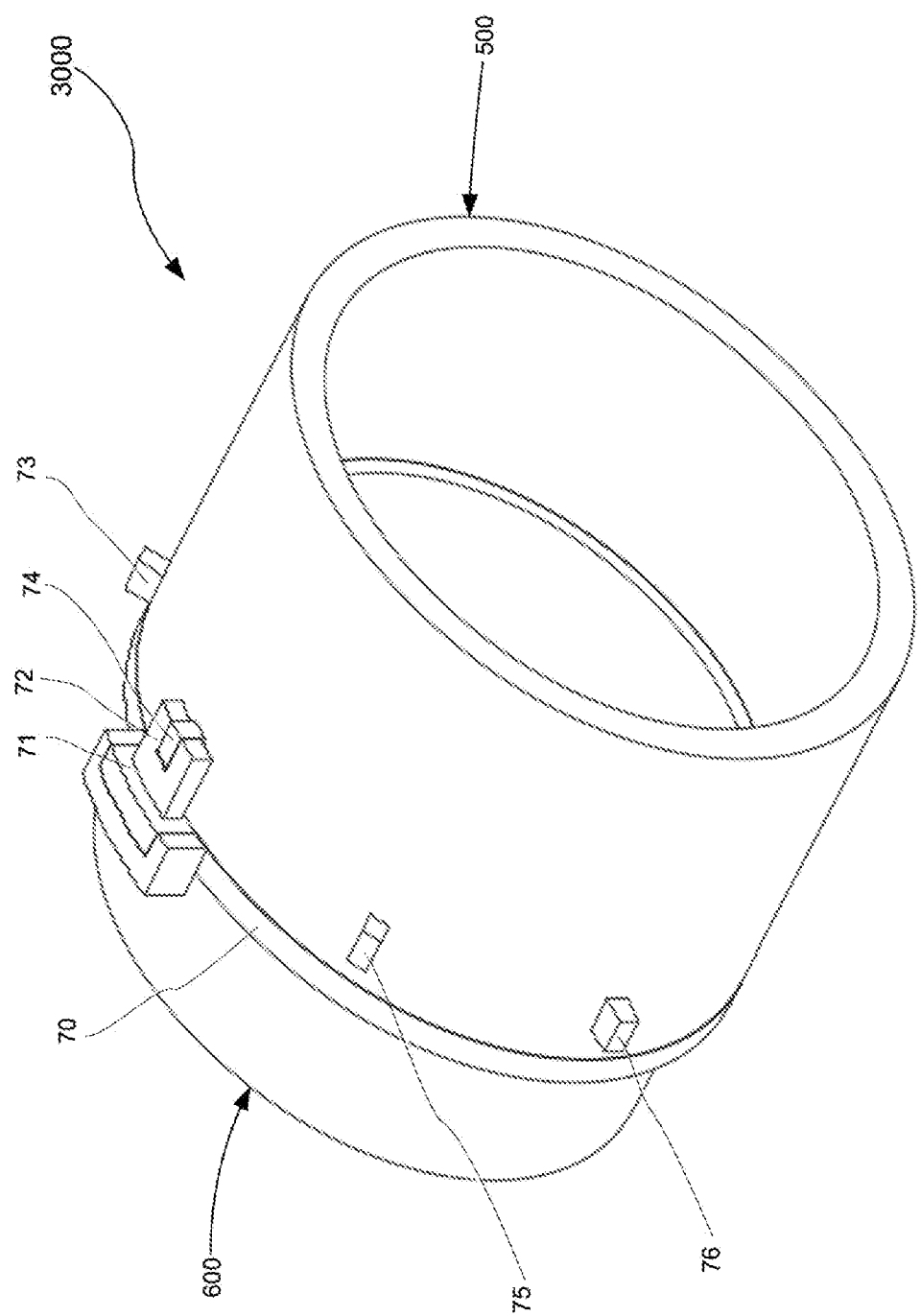
FIG. 16 is a perspective view of a tube connection shown in FIG. 13, illustrating the embodiment of the tube connection in a connected configuration, with rotatability disabled by locking latch.

Referring to FIG. 16, when users prefer to entirely restrict the relative rotational movement of the connectors, locking the tube connection 3000 in a designated angle, first rotate the tube connectors 600 and 500 so that the latch receiver 71 aligns with one of the second tier of latch stoppers (74-76), for example, latch stopper 74. Insert the fork-shaped locking latch 72 into the latch receiver 71 and secure the latch stopper 74, thereby disabling the rotatability of the tube connection 3000 and securing the two connectors 600 and 500 in the designated angel. It is worth noting that the number and distribution of latch stoppers in the tube connection of the present invention should not be considered limited to the exemplary embodiment shown in FIGS. 13-16. In different applications, the number of locking elements which is a latch in this embodiment may vary, the number and distribution of latch stoppers may vary, and accordingly, the designated rotation ranges and locking angels may also vary, and the sizes and shapes of the locking latch, latch receiver and latch stoppers may vary, and the locking elements may be in different styles.

The disclosed embodiments are illustrative, not restrictive. While specific configurations of the quick-connect and rotatable tube connection have been described, it is understood that the present invention can be applied to a wide variety of tube connections. There are many alternative ways of implementing the invention.

The invention claimed is:

1. A quick-connect, rotatable tube connection, comprising: a male connector with tiered outer teeth; a female connector with tiered internal annular grooves featuring groove-walls for holding said teeth and accommodating their movement, each of said groove-walls incorporating cross-channels for the passage of said teeth, the last groove featuring a stop-wall to be its last wall to limit the maximum axial engagement of the two connectors; and a locking mechanism operable to selectively restrict the relative rotational movement between the male and female connectors; wherein the connectors engage and disengage through relative coaxial rotation to align and misalign the teeth with the cross-channels, accompanied by axial movements allowing the teeth to pass through the cross-channels and enter adjacent grooves, thereby facilitating a quick-connect and quick-disconnect mechanism, and wherein the engaged connectors are capable of rotational movement relative to each other while maintaining the connection; wherein the locking mechanism is operable to engage with corresponding elements on both connectors to selectively restrict their relative rotational movement when engaged, and prevent the alignment of the teeth and cross-channels, thus preventing disengagement of the connectors while allowing relative rotational movement.

2. The quick-connect, rotatable tube connection of claim 1, wherein the male connector further includes position-indicating elements on its outer surface to indicate teeth locations, and the female connector further includes position-indicating elements on its outer surface to indicate the locations of cross-channels, such that the exterior observable alignment status of these position-indicating elements from the two different connectors indicates the alignment status of teeth with cross-channels inside the engaged part of the tube connection, facilitating engagement or disengagement of the tube connection.

3. The quick-connect, rotatable tube connection of claim 2, wherein the female connector further includes a sealing ring, located in the last tier of the annular groove, supported by the stop-wall of the female connector, ensures a fluid-tight seal between the fully engaged connectors, sealing the internal gap of the tube connection.

4. The quick-connect and rotatable tube connection of claim 2, wherein the male connector further includes a stop-wall behind the last tier of teeth, a sealing ring positioned between the last tier of teeth and the stop-wall of the male connector, supported by said stop-wall, sealing the gap between two fully engaged connectors from external of the tube connection and keeping it fluid-tight.

5. The quick-connect, rotatable tube connection of claim 1, wherein the female connector further includes a sealing ring, located in the last tier of the annular groove, supported by the stop-wall of the female connector, ensures a fluid-tight seal between the fully engaged connectors, sealing the internal gap of the tube connection.

6. The quick-connect, rotatable tube connection of claim 1, wherein the male connector further includes a stop-wall positioned behind the last tier of teeth, and a sealing ring located between this last tier of teeth and the stop-wall, supported by said stop-wall, sealing the external gap between the fully engaged connectors to maintain a fluid-tight tube connection.

* * * * *